(12) United States Patent
Hassan et al.

(10) Patent No.: US 10,631,349 B2
(45) Date of Patent: Apr. 21, 2020

(54) APPLICATION-TRIGGERED TETHERING

(71) Applicant: Microsoft Technology Licensing, LLC, Redmond, WA (US)

(72) Inventors: Amer Aref Hassan, Kirkland, WA (US); Hooman Shiranimehr, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 37 days.

(21) Appl. No.: 15/909,965

(22) Filed: Mar. 1, 2018

(65) Prior Publication Data
US 2019/0274175 A1  Sep. 5, 2019

(51) Int. Cl.
| | |
|---|---|
| *H04W 76/14* | (2018.01) |
| *H04W 8/24* | (2009.01) |
| *H04W 72/02* | (2009.01) |
| *H04W 88/04* | (2009.01) |
| *H04M 15/00* | (2006.01) |
| *H04W 48/16* | (2009.01) |
| *H04W 4/24* | (2018.01) |
| *H04W 48/14* | (2009.01) |

(52) U.S. Cl.
CPC .......... *H04W 76/14* (2018.02); *H04M 15/00* (2013.01); *H04M 15/93* (2013.01); *H04W 4/24* (2013.01); *H04W 8/24* (2013.01); *H04W 48/16* (2013.01); *H04W 72/02* (2013.01); *H04W 88/04* (2013.01); *H04W 48/14* (2013.01)

(58) Field of Classification Search
CPC ....... H04W 76/14; H04W 8/24; H04W 72/02; H04W 88/04
See application file for complete search history.

(56) References Cited

U.S. PATENT DOCUMENTS

| | | | |
|---|---|---|---|
| 9,713,174 B2 | 7/2017 | Kuehnel et al. | |
| 2010/0034124 A1 | 2/2010 | Payyappilly et al. | |
| 2011/0028085 A1 | 2/2011 | Waung et al. | |
| 2011/0164596 A1* | 7/2011 | Montemurro ......... | H04W 76/11 370/338 |

(Continued)

FOREIGN PATENT DOCUMENTS

| | | |
|---|---|---|
| JP | 2012227610 A | 11/2012 |
| WO | 2010074998 A1 | 7/2010 |

OTHER PUBLICATIONS

"3rd Generation Partnership Project; Technical Specification Group Services and System Aspects; Proximity-based services (ProSe); Stage 2 (Release 13)", In 3GPP Standard; 3GPP TS 23.303,vol. SA WG2,Issue—V13.0.0, Jun. 16, 2015, pp. 1-99.

(Continued)

*Primary Examiner* — Kashif Siddiqui
(74) *Attorney, Agent, or Firm* — NovoTechIP International PLLC (57) ABSTRACT

Disclosed herein is a method for obtaining Internet access via tethering is disclosed. The method may be performed by a client device. The method may include detecting one or more user actions indicating that a task requires a connection to the Internet and also that the task is time sensitive, broadcasting a tethering request in response to detecting the one or more user actions, receiving a reply from a tethering device, tethering to the tethering device, and establishing a connection to the Internet via the tethering device.

20 Claims, 6 Drawing Sheets

(56) References Cited

U.S. PATENT DOCUMENTS

| | | | |
|---|---|---|---|
| 2013/0331028 A1* | 12/2013 | Kuehnel | H04W 76/10 |
| | | | 455/41.1 |
| 2014/0254499 A1* | 9/2014 | Hassan | H04W 12/08 |
| | | | 370/329 |
| 2015/0351004 A1 | 12/2015 | Ko et al. | |
| 2016/0007394 A1 | 1/2016 | Hassan et al. | |
| 2016/0204951 A1 | 7/2016 | Walton et al. | |
| 2016/0295622 A1 | 10/2016 | Huang et al. | |
| 2017/0078962 A1 | 3/2017 | Hassan et al. | |
| 2017/0295600 A1* | 10/2017 | Hassan | H04L 67/1063 |
| 2017/0317740 A1 | 11/2017 | Basu mallick et al. | |
| 2018/0041952 A1* | 2/2018 | Ickin | H04W 16/26 |

OTHER PUBLICATIONS

"3rd Generation Partnership Project; Technical Specification Group Services and System Aspects; Study on extended architecture support for proximity-based services (Release 13)", In 3GPP Standard; 3GPP TR 23.713, vol. SA WG2, Issue—V1.4.0, Jun. 5, 2015, pp. 1-79.

"Wi-Fi Alliance Technical Committee P2P Task Group", In Wi-Fi Peer-to-Peer (P2P) Technical Specification v1.1, Jan. 1, 2010, pp. 1-159.

"International Search Report and Written Opinion Issued in PCT Application No. PCT/US19/019056", dated May 29, 2019, 15 Pages.

* cited by examiner

APPLICATION-TRIGGERED TETHERING

CROSS-REFERENCE TO RELATED APPLICATIONS

N/A

BACKGROUND

The Internet provides a wide variety of network services, such as the World Wide Web, electronic mail, multiplayer online games, Internet telephony, and file sharing services. The Internet has affected modern life in countless ways. Many traditional communications media are being redefined as a result of the Internet, giving birth to new services such as email, Internet telephony, Internet television, online music, digital newspapers, and video streaming websites. Online shopping has grown exponentially, both for major retailers and also for small businesses. The Internet has facilitated new forms of personal interaction through instant messaging, Internet forums, and social networking.

Many people use mobile computing devices (e.g., smartphones, tablet computers, laptop computers) to access the Internet. Some mobile devices include a cellular network interface and are configured with an account with a cellular service provider that enables them to access the Internet using a cellular network. Some of these devices may be configured to provide a tethering service, which is a service that enables a computing device to share the access to the Internet with one or more other devices. A device that provides a tethering service may be referred to herein as a tethering device. One or more client devices may tether to the tethering device and access the Internet via the tethering service on the tethering device. Tethering may be done over a wireless local area network (WLAN) connection, a wireless personal area network (WPAN) connection (e.g., Bluetooth®), or by physical connection using a cable.

BRIEF DESCRIPTION OF THE DRAWINGS

In order to describe the manner in which features of the disclosure can be obtained, a description will be rendered by reference to specific embodiments thereof which are illustrated in the appended drawings. For better understanding, similar reference numbers have been used for similar features in the various embodiments. Unless indicated otherwise, these similar features may have the same or similar attributes and serve the same or similar functions. Understanding that the drawings depict some examples of embodiments, the embodiments will be described and explained through the use of the accompanying drawings in which.

DETAILED DESCRIPTION

Under some circumstances, it can be difficult to find Internet access when it is needed. As just one example, consider a scenario involving someone who is writing an email message on a laptop computer. The email message may be time sensitive. For example, it may be important for the email message to be delivered within a certain limited period of time, or the email message may include information that is only valid for a particular period of time. Therefore, it may be desirable to send the email message as soon as possible. However, the laptop may not be able to access the Internet. For example, the laptop may be in a location where Internet access via Wi-Fi® is not available, and it may not be possible to establish a connection to the Internet via another mechanism. For example, even if the person writing the email message has a smartphone that has Internet access via a cellular network, the user's cellular data plan may not include tethering.

In situations such as these, there may be one or more other devices nearby that are capable of providing access to the Internet. Some of these devices may be owned by other people. For example, suppose the person writing the email is in a crowded public area (e.g., a restaurant, a library, a shopping mall). It seems reasonably likely that someone else in the surrounding area would have a device (e.g., a smartphone, a tablet computer) that is connected to the Internet and that is capable of providing access to the Internet via tethering. However, there is currently no easy way to discover such devices.

Figure 1:
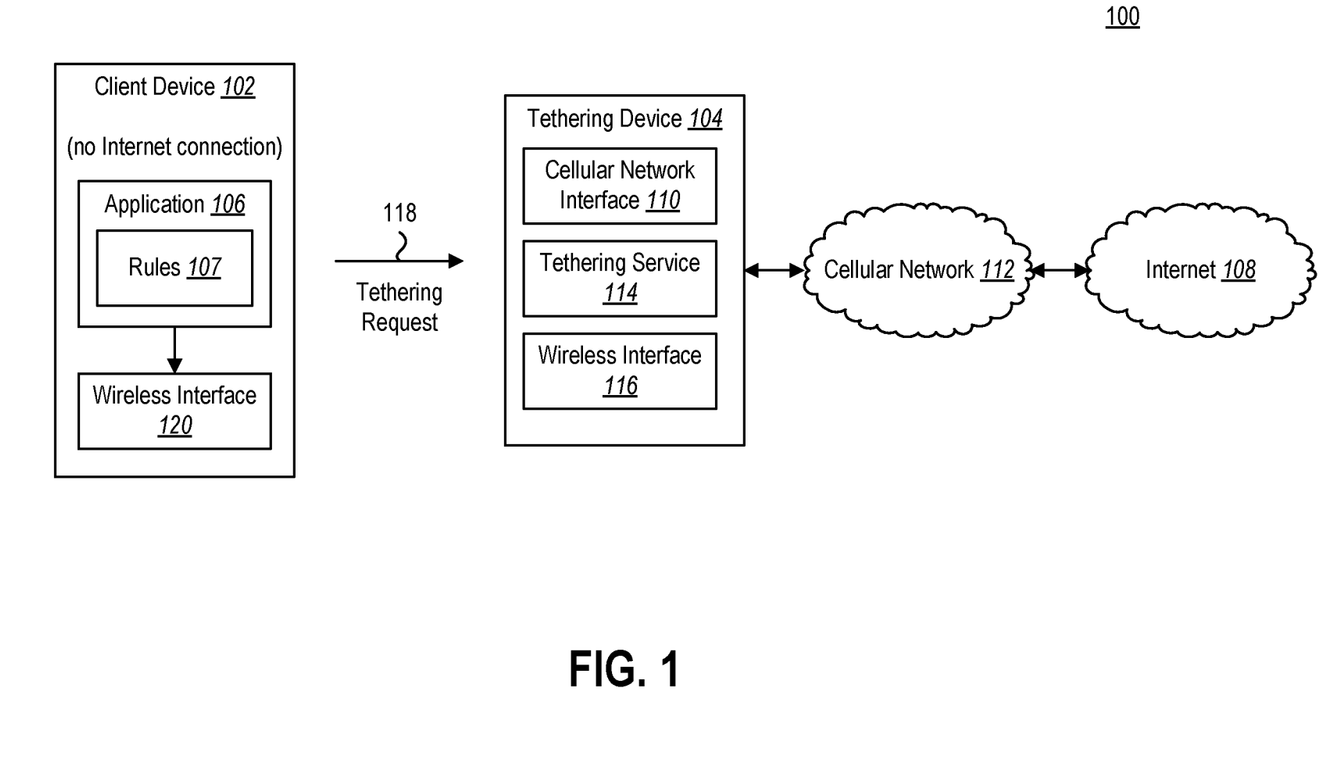
FIG. 1 illustrates an example of a system in which aspects of the present disclosure may be utilized.

The techniques disclosed herein make it possible for someone who needs temporary Internet access to discover one or more devices that are capable of providing Internet access via tethering. FIG. 1 illustrates an example involving two devices, which will be referred to as a client device 102 and a tethering device 104. In some implementations, the client device 102 and the tethering device 104 may both be mobile computing devices such as smartphones, tablet computers, laptop computers, or the like. Alternatively, the tethering device 104 may be another type of computing device (e.g., a desktop computer) or a networking device such as an access point or a base station.

Suppose that the user of the client device 102 is using an application 106 to perform a high-priority task that requires a connection to the Internet 108. Continuing with the example described above, the application 106 may be an email application, and the user may be composing an urgent email message that should be sent as soon as possible. However, the client device 102 may not currently have a connection to the Internet 108.

When the user of the client device 102 does something to indicate that the task requires an immediate connection to the Internet 108 (e.g., clicking a high-priority button in the email application), this may initiate a search for a connection to the Internet 108. There may be at least one other device nearby that is connected to the Internet 108 and that is capable of providing access to the Internet 108 via tethering. Such a device may be referred to herein as a tethering device 104. The tethering device 104 may use a cellular network interface 110 to connect to the Internet 108 via a cellular network 112. The tethering device 104 may include a tethering service 114 that is configured to share the connection to the Internet 108 with one or more other devices via tethering. Tethering may be provided via another wireless interface 116, such as a WLAN interface (e.g., Wi-Fi®) or a WPAN interface (e.g., Bluetooth®).

The client device 102 and the tethering device 104 may be owned by different individuals. The owner of the tethering device 104 may be willing to temporarily share the connection to the Internet 108 (possibly in exchange for a fee), so that the user of the client device 102 can complete the high-priority task (e.g., the email can be sent).

One or more rules 107 may be defined that indicate when user action(s) should be interpreted as requiring an immediate connection to the Internet 108. When, based on the rules 107, the application 106 detects one or more user actions indicating that an immediate connection to the Internet 108 is required, the application 106 may initiate a search for another device that is able to provide access to the Internet 108 via tethering. There are many different types of user actions that may be interpreted as indicating that an immediate connection to the Internet 108 is required. Some examples of user actions include providing input using an input device such as a mouse or a keyboard, providing audible input via a microphone, making one or more motions (e.g., swiping in a particular direction) using a touchscreen display, and making a gesture (the user shaking his or her head or making a particular hand motion).

The application 106 may cause the client device 102 to wirelessly transmit a tethering request 118 to access the Internet 108 via tethering. The tethering request 118 may indicate that the client device 102 is looking for a device to which it can tether in order to establish a connection to the Internet 108. The tethering request 118 may include just a single message, or it may include multiple messages that collectively communicate a desire to tether to another device. The tethering request 118 may be sent as a broadcast communication, such that any tethering devices 104 that are located within a communication range of the client device 102 receive the tethering request 118.v The client device 102 may include a wireless interface 120 that may be used to broadcast the tethering request. The wireless interface 120 may be similar to the wireless interface 116 on the tethering device 104 (e.g., a WLAN interface, a WPAN interface).

The tethering device 104 may respond to the tethering request 118 via the wireless interface 116. If the tethering device 104 responds to the tethering request 118, and if the user of the client device 102 and the user of the tethering device 104 are able to agree upon terms for the requested tethering (e.g., cost, duration, data usage limit), the client device 102 may become tethered to the tethering device 104 and may establish a connection to the Internet 108 via the tethering device 104. The application 106 may then use the connection to the Internet 108, via the tethering device 104, to complete the high-priority task. Once the high-priority task has been completed (or when the tethering should otherwise be terminated in accordance with the agreed-upon terms), the client device 102 may disconnect from the tethering device 104.

Thus, the present disclosure proposes a technique whereby a client device 102 may be temporarily tethered to another device (the tethering device 104) in order to access the Internet 108 and complete the high-priority task. Advantageously, it is not necessary for the user of the client device 102 to initiate tethering. Instead, the search for a connection to the Internet 108 may be initiated by the application 106 itself, based upon one or more rules 107. In other words, it may be the application 106, not the user of the client device 102, that triggers the tethering. The application 106 may automatically initiate a search for a connection to the Internet 108 in response to detecting one or more user actions which indicate that (i) the application 106 is being used to perform a task that requires a connection to the Internet 108, and (ii) the task is high priority. Once the application 106 detects both (i) and (ii), the application 106 may automatically initiate the search for a connection to the Internet 108 without any additional user input. Thus, the application 106 may initiate tethering without the user of the client device 102 being required to provide input that instructs the client device 102 to initiate tethering.

Figure 2:
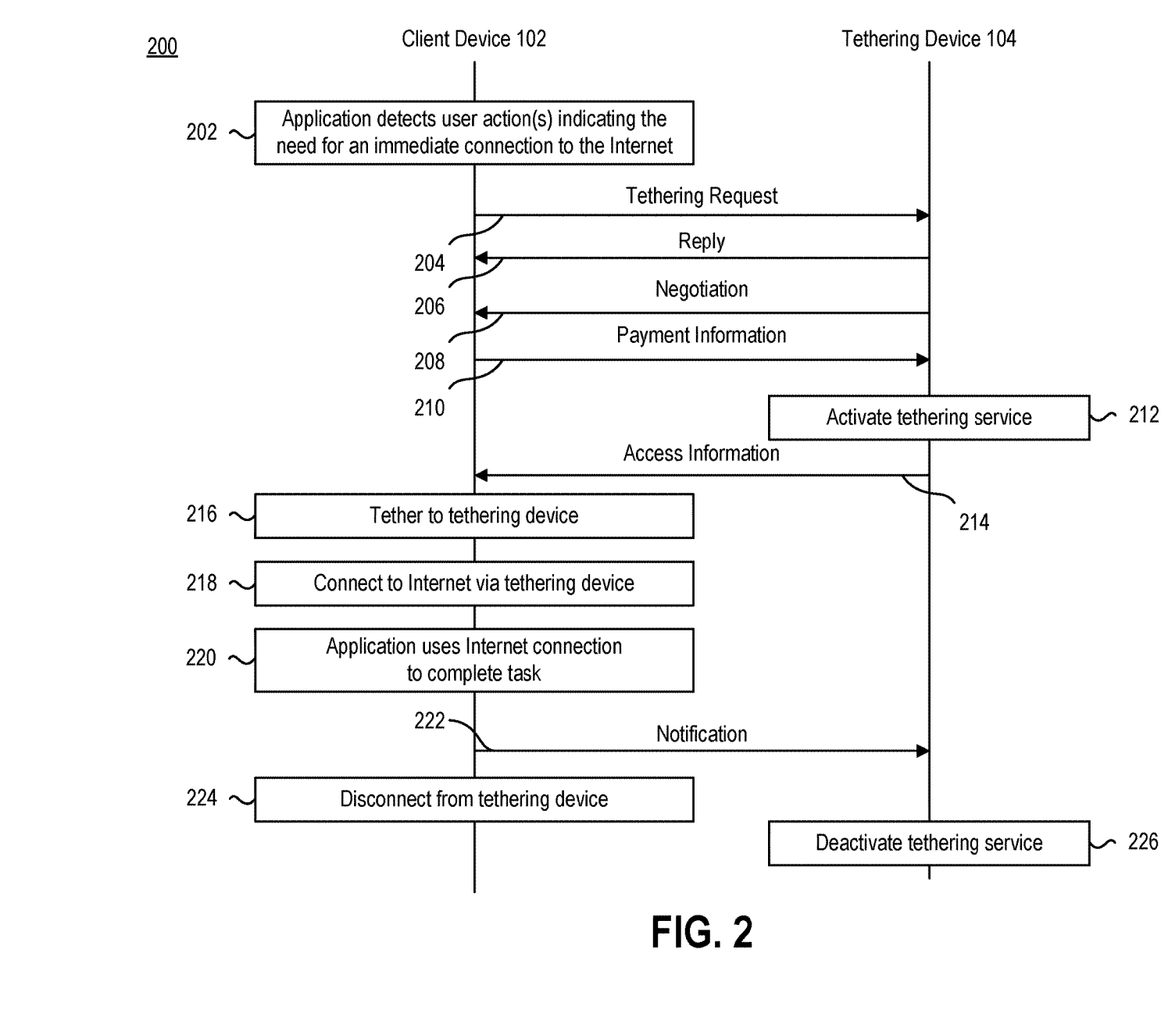
FIG. 2 illustrates an example of a method for facilitating access to the Internet via tethering.

FIG. 2 illustrates an example of a method 200 for facilitating access to the Internet 108 via tethering. The method 200 will be described in relation to the client device 102 and the tethering device 104 in the system 100 of FIG. 1.

At some point while an application 106 on a client device 102 is being used to perform a task, the user of the client device 102 may take one or more actions to indicate that the task requires a connection to the Internet 108. The action(s) may also indicate that the task is time sensitive, and therefore the need for the connection to the Internet 108 is urgent. The action(s) may include selecting one or more options in the application 106 that indicate urgency or the need for immediate action. For example, as discussed above, if the application 106 is an email application, the user's activation of a high-priority button in the email application may be interpreted as an indication that an immediate connection to the Internet 108 is needed. As another example, if the application 106 is being used to create one or more documents (e.g., word processing documents, spreadsheets), the user's selection of one or more options related to backing up the document(s) online or sharing the document(s) with other users may be interpreted as an indication that an immediate connection to the Internet 108 is needed. In some cases, simply opening an application 106 may be interpreted as an indication that an immediate connection to the Internet 108 is needed. This may be the case, for example, with an instant messaging or social media application.

The application 106 may detect 202, based on defined rules 107, one or more user actions indicating that an immediate connection to the Internet 108 is needed. In response, the application 106 may automatically initiate a search for an opportunity to access the Internet 108 via tethering. Thus, in the depicted method 200, one or more user actions may have the effect of initiating tethering. However, the user action(s) may not be specifically related to tethering. For example, as discussed above, the user's selection of a high-priority button in an email application may trigger tethering. However, the high-priority button itself is not related to tethering. Therefore, one potential advantage of the depicted method 200 is that the user of the client device 102 is not required to initiate tethering. Instead, the application 106 may automatically initiate tethering in response to detecting 202 one or more user actions which may be interpreted as suggesting that tethering might be useful for the user.

To initiate tethering, the application 106 may cause the client device 102 to broadcast 204 a tethering request 118 via the wireless interface 120. This may, for example, involve making one or more application programming interface (API) calls to a driver of the wireless interface 120.

A tethering device 104 may receive the tethering request 118 and send 206 a reply back to the client device 102. The client device 102 and the tethering device 104 may negotiate 208 about the terms for the proposed tethering. An example of this type of negotiation 208 will be discussed below in connection with FIG. 3.

If the user of the client device 102 and the user of the tethering device 104 are able to agree on terms for the requested tethering, then the client device 102 may provide 210 payment information to the tethering device 104. The payment information may include information about one or more financial accounts. For example, the client device 102 may provide a credit card number or a debit card number to the tethering device 104. The payment information may be provided to the tethering device 104 via a digital wallet (or e-wallet) transaction. Public key cryptography may be used to facilitate the secure transmission of payment information. Alternatively, providing 210 payment information may involve communicating with a separate payment processing server.

Once the tethering device 104 receives the payment information, the tethering device 104 may take whatever actions are necessary in order to share the connection to the Internet 108 with the client device 102. For example, the tethering device 104 may activate 212 the tethering service 114. The tethering device 104 may also provide 214 the client device 102 with any information (shown as access information in FIG. 2) that may be needed to tether to the tethering device 104, such as the name of the tethering device 104 and/or a password. Alternatively, such information may be provided when the tethering device 104 sends 206 a reply to the tethering request 118.

The client device 102 may then tether 216 to the tethering device 104 and connect 218 to the Internet 108 via the tethering device 104. Once the client device 102 has established a connection to the Internet 108 via the tethering device 104, the application 106 may use 220 the connection to the Internet 108 to complete the task (such as sending the email in the example discussed above). Once the task has been completed (or when the terms otherwise specify that the tethering should end), the client device 102 may notify 222 the tethering device 104 that the connection to the Internet 108 is no longer needed and disconnect 224 from the tethering device 104. In response to receiving the notification from the client device 102, the tethering device 104 may deactivate 226 the tethering service 114 so that the connection to the Internet 108 is no longer being shared.

Figure 3:
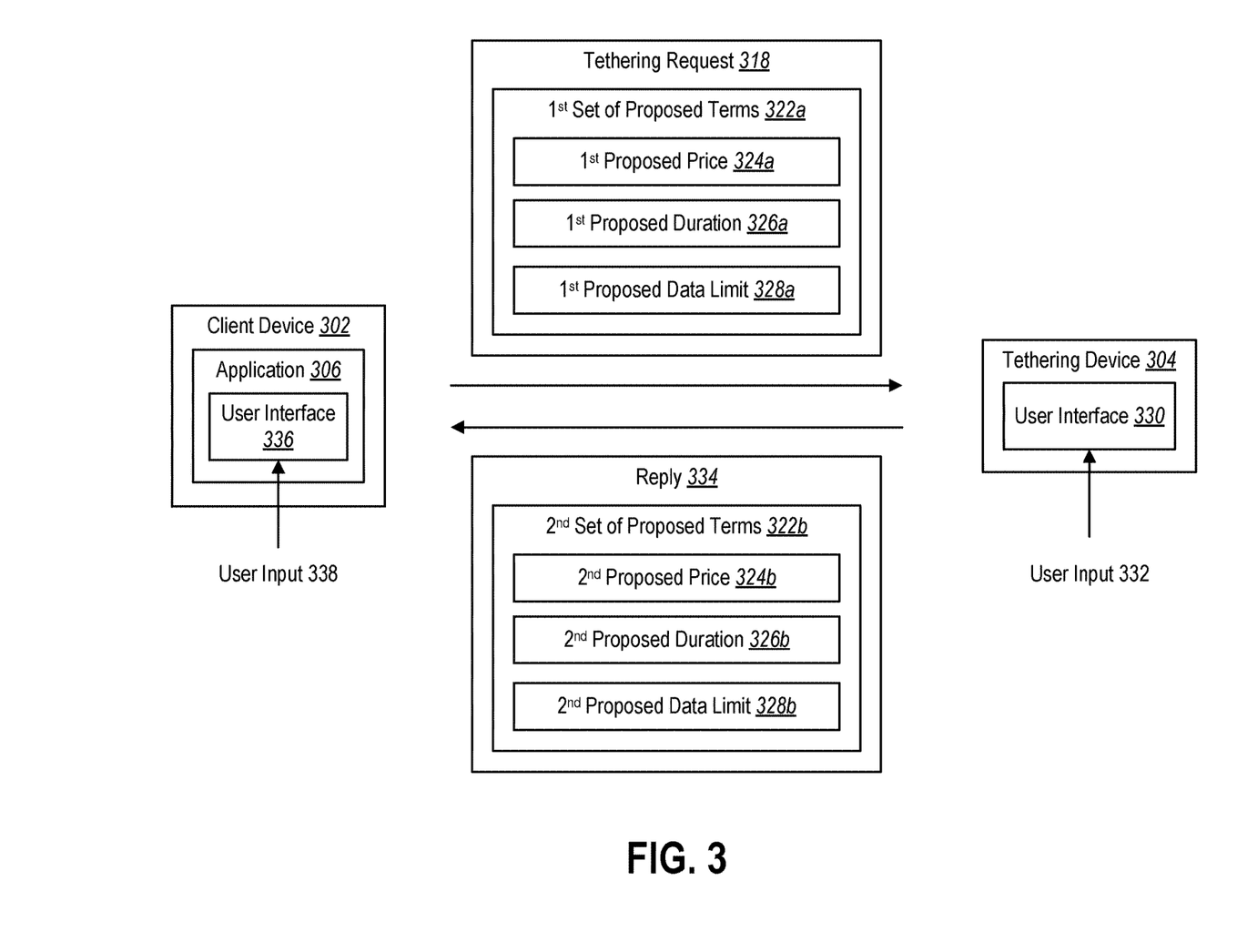
FIG. 3 illustrates an example of negotiation between a client device and a tethering device.

FIG. 3 illustrates an example of negotiation between a client device 302 and a tethering device 304. The client device 302 may send a tethering request 318 that includes a first set of proposed terms 322a for the requested connection to the Internet 108. As used herein, the phrase "proposed terms" refers to one or more conditions that are related to establishing a connection to the Internet 108. The first set of proposed terms 322a may include, a first proposed price 324a, a first proposed duration 326a, and a first proposed data limit 328a (i.e., a maximum amount of data that will be used). For example, the tethering request 318 may indicate a willingness to pay a certain amount (e.g., $5.00) for a connection to the Internet 108 that lasts for a certain amount of time (e.g., 15 minutes) and that uses no more than a certain amount of data (e.g., 500 MB).

The first set of proposed terms 322a in the tethering request 318 may be presented to the user of the tethering device 304. For example, the first set of proposed terms 322a in the tethering request 318 may be displayed to the user of the tethering device 304 via a user interface 330. The user of the tethering device 304 may provide user input 332 either accepting or rejecting the first set of proposed terms 322a. If the user of the tethering device 304 rejects the first set of proposed terms 322a, he/she may be given the opportunity to propose new terms. In this case, the reply 334 that the tethering device 304 sends back to the client device 302 may include a second set of proposed terms 322b, which may include a second proposed price 324b and/or a second proposed duration 326b and/or a second proposed data limit 328b. The second set of proposed terms 322b may include a higher price (e.g., $7.50) and/or a shorter duration (e.g., 10 minutes) and/or a lower maximum amount of data (e.g., 250 MB) than the first set of proposed terms 322a in the tethering request 318.

The second set of proposed terms 322b in the reply 334 may be presented to the user of the tethering device 304. For example, the second set of proposed terms 322b in the reply 334 may be displayed to the user of the client device 302 via a user interface 336 (which may be part of the application 306 that triggered the tethering). The user of the client device 302 may provide user input 338 either accepting or rejecting the second set of proposed terms 322b. If the user of the client device 302 rejects the second set of proposed terms 322b, he/she may be given the opportunity to continue the negotiation by proposing an additional set of new terms. This process of negotiation may continue until the user of the client device 302 and the user of the tethering device 304 are able to agree on terms for the requested tethering, or until they terminate their negotiations.

In the above discussion, it has been assumed that the owner of the client device 102 and the owner of the tethering device 104 are different. Under some circumstances, however, the client device 102 and the tethering device 104 may be owned by the same person. For example, the owner of a tethering device 104 may want to provide access to the Internet 108 to one or more of his/her client devices 102. When this occurs, it may not be necessary for any negotiation to occur between the client device 102 and the tethering device 104, or for the client device 102 to provide payment information.

Figure 4:
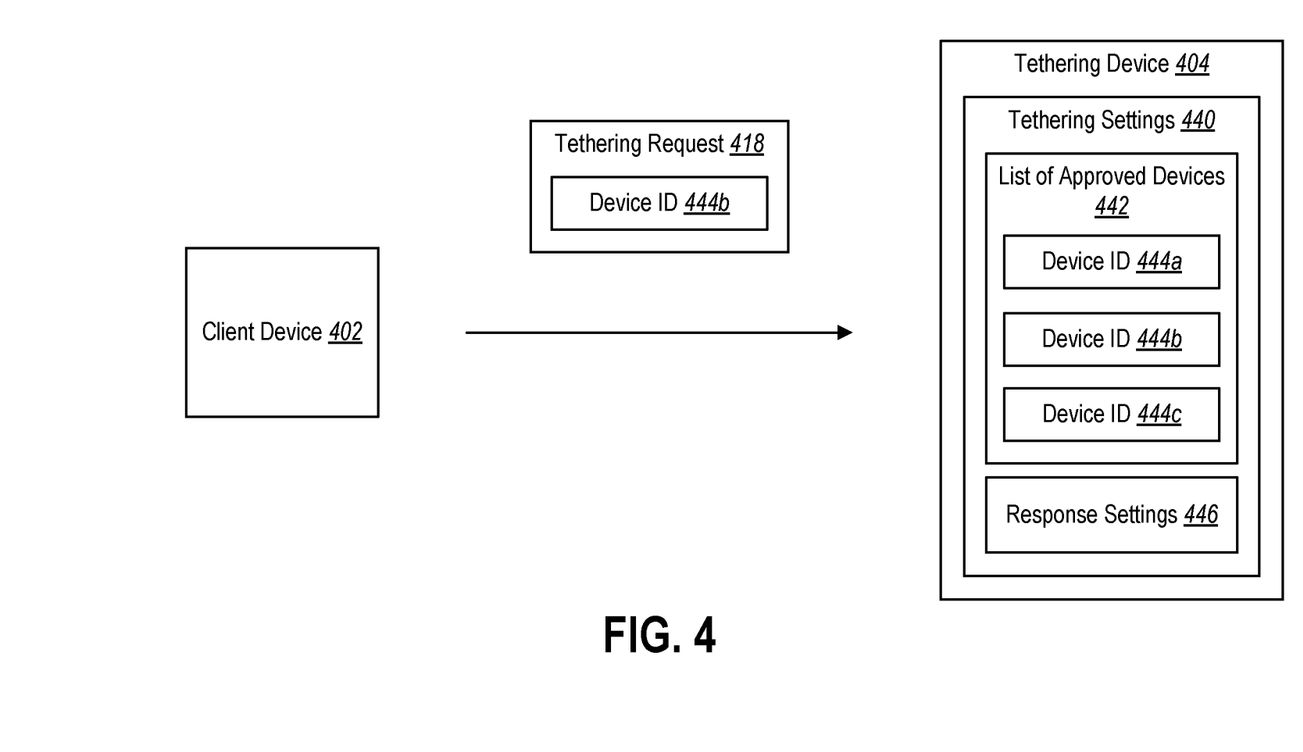
FIG. 4 illustrates an example of tethering settings on a tethering device.

Referring now to FIG. 4, tethering settings 440 on a tethering device 404 may include a list 442 of approved devices. Tethering may be provided to approved devices at no cost. Thus, tethering may be provided to the devices on the list 442 of approved devices without entering into any negotiation or requiring any payment. The list 442 of approved devices may include a plurality of device identifiers (IDs) 444a-c. Each of the device IDs 444a-c may uniquely identify a specific client device 402.

When a tethering request 418 is received, the tethering device 404 may compare a device ID 444b in the tethering request 418 with the device IDs 444a-c in the list 442 of approved devices. If the device ID 444b in the tethering request 418 matches one of the device IDs 444a-c in the list 442 of approved devices (as it does in the example shown in FIG. 4), then the tethering device 404 may provide tethering to the client device 402 without the need for any kind of negotiation and without requiring any payment information from the client device 402. If, however, the device ID 444b in the tethering request 418 does not match any of the device IDs 444a-c in the list 442 of approved devices, then the client device 402 and the tethering device 404 may enter into a process of negotiation as described above in relation to FIGS. 2 and 3, and the tethering device 404 may require payment information from the client device 402 before providing the requested tethering.

The tethering settings 440 may also include one or more settings that define when the tethering device 404 responds to tethering requests 418. Such settings are shown as response settings 446 in FIG. 4. The user of a tethering device 404 may only want to provide tethering to his/her own client devices 402, and may not ever want to provide tethering to client devices 402 owned by other people. In this case, the response settings 446 may be configured to indicate that tethering requests 418 should be ignored unless the device ID 444b in the tethering request 418 matches one of the device IDs 444a-c in the list 442 of approved devices. If, however, the user of the tethering device 404 may be willing to provide tethering to client devices 402 owned by other people under some circumstances, then the response settings 446 may be configured to indicate that the tethering device 404 should respond to tethering requests 418, even if the device ID 444b in the tethering request 418 does not match any of the device IDs 444a-c in the list 442 of approved devices.

Figure 5:
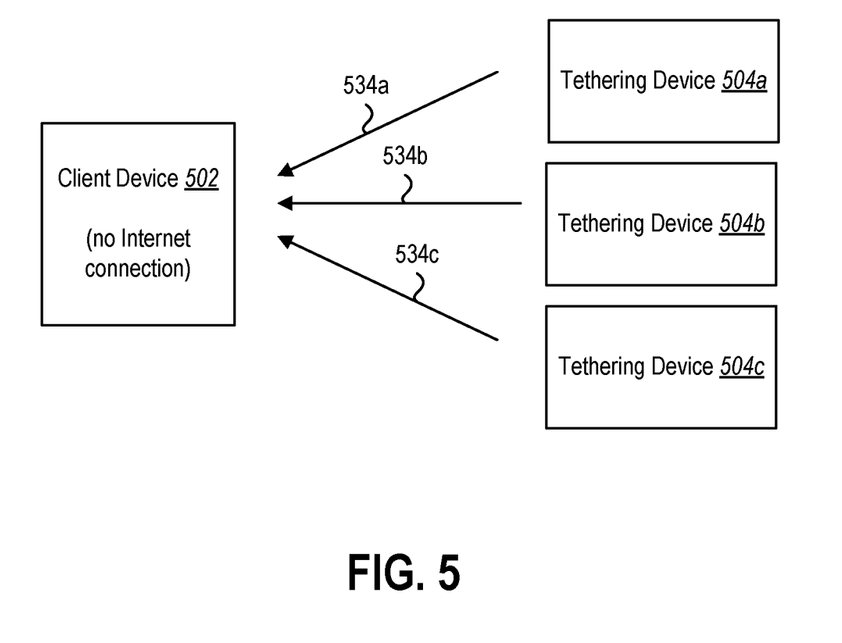
FIG. 5 illustrates an example in which a client device receives multiple replies to a tethering request.

As shown in FIG. 5, if there are multiple tethering devices 504a-c in the surrounding area that are willing to share a connection to the Internet 108 with a client device 502, each of these tethering devices 504a-c may respond to a tethering request 118. Thus, a client device 502 may receive a plurality of replies 534a-c from a plurality of tethering devices 504a-c in response to broadcasting a tethering request 118. When this happens, the client device 502 may select one of the tethering devices 504a-c to provide tethering. For example, the client device 502 may select one of the tethering devices 504a-c whose reply includes the most favorable terms for tethering.

Figure 6:
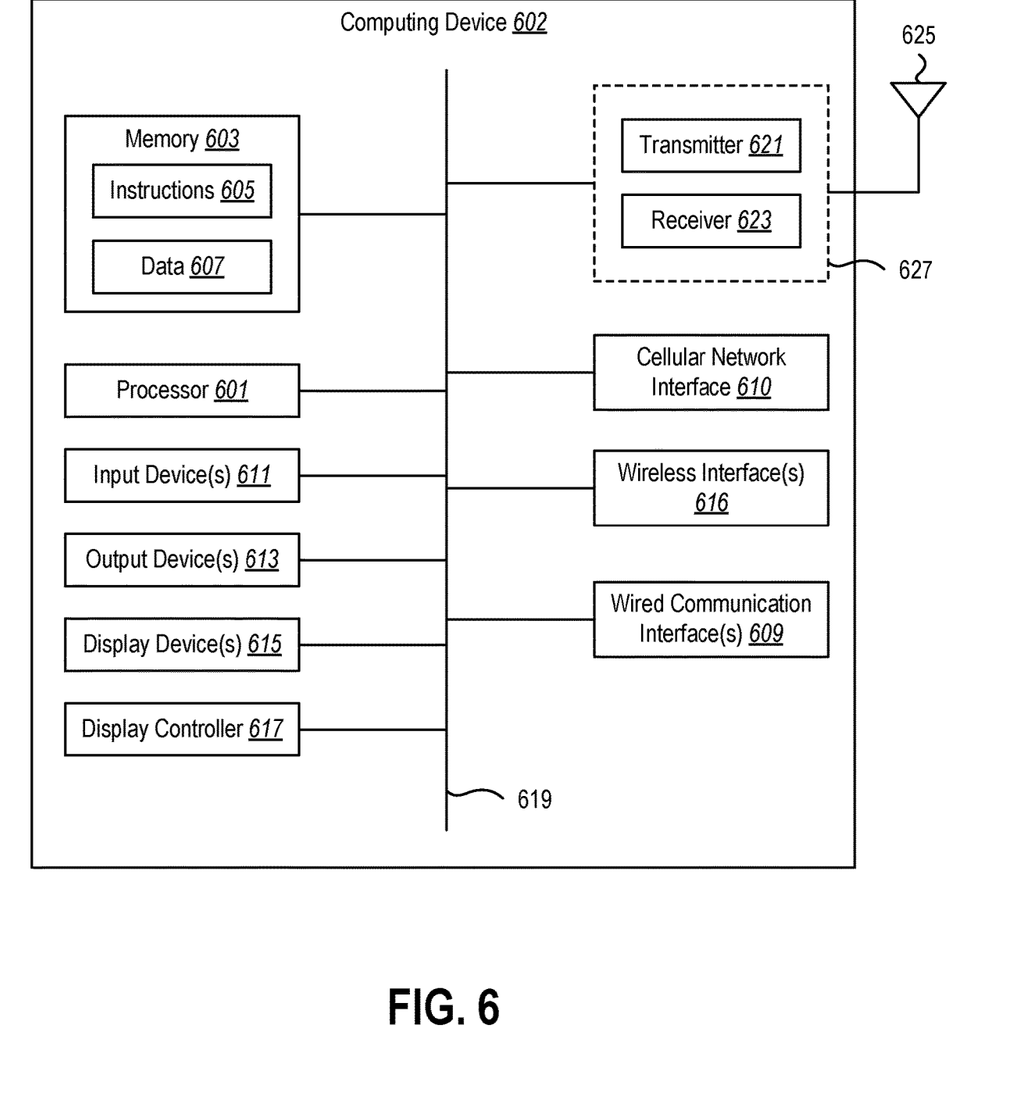
FIG. 6 illustrates certain components that may be included in a computing device.

FIG. 6 illustrates certain components that may be included in a computing device 602. Any of the client devices 102, 302, 402, 502 or tethering devices 104, 304, 404, 504a-c described herein may be implemented with some or all of the components shown in the computing device 602.

The computing device 602 includes a processor 601. The processor 601 may be a general purpose single- or multi-chip microprocessor (e.g., an Advanced RISC (Reduced Instruction Set Computer) Machine (ARM)), a special purpose microprocessor (e.g., a digital signal processor (DSP)), a microcontroller, a programmable gate array, etc. The processor 601 may be referred to as a central processing unit (CPU). Although just a single processor 601 is shown in the computing device 602 of FIG. 6, in an alternative configuration, a combination of processors (e.g., an ARM and DSP) could be used.

The computing device 602 also includes memory 603. The memory 603 may be any electronic component capable of storing electronic information. For example, the memory 603 may be embodied as random access memory (RAM), read-only memory (ROM), magnetic disk storage media, optical storage media, flash memory devices in RAM, on-board memory included with the processor, erasable programmable read-only memory (EPROM), electrically erasable programmable read-only memory (EEPROM) memory, registers, and so forth, including combinations thereof.

Instructions 605 and data 607 may be stored in the memory 603. The instructions 605 may be executable by the processor 601 to implement some or all of the functionality that has been described herein with respect to the client devices 102, 302, 402, 502 or tethering devices 104, 304, 404, 504a-c. For example, the instructions 605 may be executable by the processor 601 to perform some or all of the operations described above in connection with the method 200 shown in FIG. 2. Any of the various examples of modules and components described herein may be implemented, partially or wholly, as instructions 605 stored in memory 603 and executed by the processor 601.

Executing the instructions 605 may involve the use of the data 607 that is stored in the memory 603. Any of the various examples of data described herein may be among the data 607 that is stored in memory 603 and used during execution of the instructions 605 by the processor 601. Some examples of data 607 that may be stored in the memory 603 and used in connection with executing the instructions 605 include one or more rules for determining when user actions indicate that a task requires a connection to the Internet and is also time sensitive, one or more tethering requests 118 and corresponding replies 334, information about the format and structure of a tethering request 118 and a corresponding reply 334, proposed terms 322a-b for tethering, user input 332, 338 regarding the proposed terms 322a-b, and payment information.

The computing device 602 may also include a cellular network interface 610 and one or more other wireless interfaces 616 in addition to the cellular network interface 610. The wireless interface(s) 616 may include a WLAN interface, a WPAN interface, or the like. The cellular network interface 610 and the wireless interface(s) 616 may utilize a transmitter 621 and a receiver 623 to facilitate wireless transmission and reception of signals to and from the computing device 602 via an antenna 625. The transmitter 621 and receiver 623 may be collectively referred to as a transceiver 627. If the computing device 602 is implementing a client device 102, the transceiver 627 may enable the computing device 602 to send tethering requests 118, negotiate with tethering devices 104, tether to tethering devices 104, and so forth. If the computing device 602 is implementing a tethering device 104, the transceiver 627 may enable the computing device 602 to receive and reply to tethering requests 118, negotiate with client devices 102, allow client devices 102 to access a connection to the Internet 108 via tethering, and so forth. In some embodiments, the computing device 602 may include (not shown) multiple transmitters, multiple antennas, multiple receivers and/or multiple transceivers.

The computing device 602 may also include one or more other communication interfaces 609, at least some of which may be based on wired communication technology. For example, the one or more other communication interfaces 609 may include a Universal Serial Bus (USB) and/or an Ethernet adapter.

The computing device 602 may also include one or more input devices 611 and one or more output devices 613, which may be used to provide user input 332, 338. Some examples of input devices 611 include a keyboard, mouse, microphone, remote control device, button, joystick, trackball, touchpad, and lightpen. Some examples of output devices 613 include a speaker and a printer. One specific type of output device that is typically included in a computing device 602 is a display device 615. Information about proposed terms 322a-b in a tethering request 318 and/or a reply 334 may be displayed to the user via the display device 615. Display devices 615 used with embodiments disclosed herein may utilize any suitable image projection technology, such as liquid crystal display (LCD), light-emitting diode (LED), gas plasma, electroluminescence, or the like. The display device 615 may be a touchscreen display. A display controller 617 may also be provided, for converting data 607 stored in the memory 603 into text, graphics, and/or moving images (as appropriate) shown on the display device 615.

The various components of the computing device 602 may be coupled together by one or more buses, which may include a power bus, a control signal bus, a status signal bus, a data bus, etc. For the sake of clarity, the various buses are illustrated in FIG. 6 as a bus system 619.

In accordance with an aspect of the present disclosure, a method for obtaining Internet access via tethering is disclosed. The method may be performed by a client device. The method may include detecting one or more user actions indicating that a task requires an Internet connection and also that the task is time sensitive. In response to detecting the one or more user actions, a tethering request may be broadcast. The method may also include receiving a reply from a tethering device, tethering to the tethering device, and establishing the Internet connection via the tethering device.

The task may be performed using an application that is running on the client device. The broadcasting of the tethering request may be initiated by the application.

The tethering request may include first proposed terms for the tethering. The reply may include second proposed terms for the tethering.

The method may further include presenting the second proposed terms to a user of the client device and receiving user input accepting or rejecting the second proposed terms.

The method may further include providing payment information to the tethering device. The client device may not be permitted to tether to the tethering device until the payment information is received by the tethering device.

The method may further include using the Internet connection to complete the task, notifying the tethering device that the Internet access is no longer needed, and disconnecting from the tethering device.

The method may further include receiving a plurality of replies from a plurality of tethering devices, and selecting one of the plurality of tethering devices to provide the tethering.

The task may be performed using an application that is running on the client device. Detecting the one or more user actions may include detecting a selection of an option in the application.

In accordance with another aspect of the present disclosure, a client device that is configured to obtain Internet access via tethering may include one or more processors and memory. The memory may include instructions that are executable by the one or more processors to perform operations including detecting one or more user actions indicating that a task requires an Internet connection and also that the task is time sensitive, broadcasting a tethering request in response to detecting the one or more user actions, receiving a reply from a tethering device, tethering to the tethering device, and establishing a connection to the Internet via the tethering device.

In accordance with another aspect of the present disclosure, a tethering device may be configured to provide Internet access to a client device via tethering. The tethering device may include one or more processors and memory. The memory may include instructions that are executable by the one or more processors to perform certain operations. The operations may include receiving a tethering request from the client device and sending a reply to the client device. The tethering request may include first proposed terms for the tethering, and the reply may include second proposed terms for the tethering. The operations may also include receiving payment information form the client device and activating a tethering service to enable the client device to tether to the tethering device and establish an Internet connection.

The operations may further include presenting the first proposed terms to a user of the tethering device, and receiving user input rejecting the first proposed terms and providing the second proposed terms.

The tethering device may include a list of approved devices. The list of approved devices may include a plurality of device identifiers. The payment information may be received from the client device in response to determining that a device identifier in the tethering request does not match any of the plurality of device identifiers in the list of approved devices.

The operations may further include deactivating the tethering service in response to receiving notification from the client device that the Internet access is no longer needed.

The techniques described herein may be implemented in hardware, software, firmware, or any combination thereof, unless specifically described as being implemented in a specific manner. Any features described as modules, components, or the like may also be implemented together in an integrated logic device or separately as discrete but interoperable logic devices. If implemented in software, the techniques may be realized at least in part by a non-transitory processor-readable storage medium comprising instructions that, when executed by at least one processor, perform one or more of the methods described herein. The instructions may be organized into routines, programs, objects, components, data structures, etc., which may perform particular tasks and/or implement particular data types, and which may be combined or distributed as desired in various embodiments.

The steps and/or actions of the methods described herein may be interchanged with one another without departing from the scope of the claims. In other words, unless a specific order of steps or actions is required for proper operation of the method that is being described, the order and/or use of specific steps and/or actions may be modified without departing from the scope of the claims.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. For example, any element or feature described in relation to an embodiment herein may be combinable with any element or feature of any other embodiment described herein, where compatible.

The present disclosure may be embodied in other specific forms without departing from its spirit or characteristics. The described embodiments are to be considered as illustrative and not restrictive. The scope of the disclosure is, therefore, indicated by the appended claims rather than by the foregoing description. Changes that come within the meaning and range of equivalency of the claims are to be embraced within their scope.

What is claimed is:

1. A method of operating a device for obtaining network access via tethering, comprising:
   receiving, via a user interface of the device, a user input;
   determining, based on a predetermined rule, that the user input requires an immediate network connection, the predetermined rule defining whether the user input should be interpreted as requiring an immediate network connection;
   upon determining that the user input requires an immediate network connection, broadcasting a tethering request;

receiving a plurality of replies from a plurality of tethering devices, respectively;
selecting one of the plurality of tethering devices for tethering; and
establishing, via the selected tethering device, a connection to a network.

2. The method of claim 1, wherein the device operates an application that performs determining that the user input requires an immediate network connection and broadcasting the tethering request.

3. The method of claim 1, wherein:
the tethering request comprises a first proposed term for the tethering; and
the reply comprises a second proposed term for the tethering.

4. The method of claim 3, further comprising:
presenting the second proposed term to a user of the device; and
receiving a user input accepting or rejecting the second proposed term.

5. The method of claim 1, further comprising providing payment information to the selected tethering device, wherein the selected tethering device provides the tethering to the device after receiving the payment information from the device.

6. The method of claim 1, further comprising:
using the connection to the network, perform a task associated with the user input;
after completing the task, notifying the tethering device that the tethering is no longer needed; and
discontinuing the connection to the network via the tethering device.

7. The method of claim 1, wherein:
the device operates an application that requires a network connection for performing a task, and
the user input comprises a user selection of an option of the application.

8. A device comprising:
a processor; and
a memory in communication with the processor, the memory comprising executable instructions that, when executed by the processor, cause the processor to control the device to perform functions of:
receiving, via a user interface of the device, a user input;
determining, based on a predetermined rule, that the user input requires an immediate network connection, the predetermined rule defining whether the user input should be interpreted as requiring an immediate network connection;
upon determining that the user input requires an immediate network connection, broadcasting a tethering request;
receiving a plurality of replies from a plurality of tethering devices, respectively;
selecting one of the plurality of tethering devices for tethering; and
establishing, via the selected tethering device, a connection to a network.

9. The device of claim 8, wherein the device operates an application that performs determining that the user input requires an immediate network connection and broadcasting the tethering request.

10. The client device of claim 8, wherein:
the tethering request comprises a first proposed term for the tethering; and
the reply comprises a second proposed term for the tethering.

11. The client device of claim 10, wherein the instructions, when executed by the processor, further cause the processor to control the device to perform functions of:
presenting the second proposed term to a user of the client device; and
receiving a user input accepting or rejecting the second proposed term.

12. The device of claim 8, wherein:
the instructions, when executed by the processor, further cause the processor to control the device to perform a function of providing payment information to the selected tethering device, and
the selected tethering device provides the tethering to the device after receiving the payment information from the device.

13. The client device of claim 8, wherein the instructions, when executed by the processor, further cause the processor to control the device to perform functions of:
using the connection to the network, perform a task associated with the user input;
after completing the task, notifying the tethering device that the tethering is no longer needed; and
discontinuing the connection to the network via the tethering device.

14. The device of claim 8, wherein:
the device operates an application that requires a network connection for performing a task, and
the user input comprises a user selection of an option of the application.

15. A device comprising:
a processor; and
a memory in communication with the processor, the memory comprising executable instructions that, when executed by the processor, cause the processor to control the device to perform functions of:
receiving, from a remote device, a tethering request comprising a first proposed term for tethering;
presenting the first proposed term to a user of the device;
receiving a user input rejecting the first proposed term and providing a second proposed term;
sending, to the remote device, a reply comprising the second proposed term for the tethering;
receiving payment information from the remote device; and
providing the tethering to the remote device such that the remote device establishes, via the device, a connection to a network.

16. The device of claim 15, wherein:
the tethering request includes a device identifier of the remote device;
the device stores, in a data storage, a list of approved devices for tethering, the list including a plurality of device identifiers of the approved devices, and
the instructions, when executed by the processor, further cause the processor to control the to perform a function of determining that the device identifier of the remote device included in the tethering request does not match any of the plurality of device identifiers in the list of the approved devices.

17. The device of claim 15, wherein the instructions, when executed by the processor, further cause the processor to control the device to perform functions of:
receiving, from the remote device, a notification that the tethering is no longer needed; and upon receiving the notification, stopping the tethering for the remote device.

18. The method of claim 1, wherein the connection to the network includes an Internet connection.

19. The device of claim 8, wherein the connection to the network connection includes an Internet connection.

20. The tethering device of claim 15, wherein the connection to the network includes an Internet connection.

* * * * *